Jan. 11, 1938.  C. B. HILL  2,105,078

PROPORTIONING DEVICE

Filed Oct. 28, 1936

INVENTOR
CHARLES B. HILL
BY
ATTORNEY.

Patented Jan. 11, 1938

2,105,078

UNITED STATES PATENT OFFICE 2,105,078

PROPORTIONING DEVICE

Charles B. Hill, El Monte, Calif., assignor to Hill Brothers Chemical Co., Inc., Los Angeles, Calif., a corporation of California Application October 28, 1936, Serial No. 107,987

6 Claims. (Cl. 210—29)

My invention relates to apparatus for chemically treating liquids, and more particularly to a proportioning device adapted to add small quantities of one liquid to a body of another liquid.

My invention comprises a novel combination of parts providing a device capable of automatically supplying accurately measured quantities of a liquid, such as a chemical solution, to a body of water, or other liquids, in exact volumetric proportions.

My invention finds utility in a wide range of commercial uses, the apparatus being adapted for comparatively small installations for treating boiler water to prevent liming of the boiler, cooling tower water to kill algae growth, water supplied to animal watering troughs to prevent growth of algae and kill bacteria, as well as for large installations operable for chlorinating swimming pools, pipe lines, etc.

It is a primary object of my invention to provide a proportioning device adapted to add quantities of a treating solution to water used for the above indicated purposes, the device supplying the solution to the water to be treated in exact volumetric proportion to the water supplied for such use.

It is another object of the invention to provide a device of the character described embodying novel features of construction and novel control means involving a supply tank from which a liquid is intermittently discharged in measured quantities and at intervals controlled as a function of the volume of liquid supplied to the tank, and means operated by the liquid discharging from the tank for intermittently discharging measured quantities of a solution into a liquid to be treated.

Another object of the invention is to provide a novel combination of elements in such a device for the purposes above stated having a novel mode of operation, and to this end my invention consists in the general combination as well as details of construction embodying the invention in its preferred form, as described in the following part of the specification and illustrated in the accompanying drawing in which.

Figure 1:
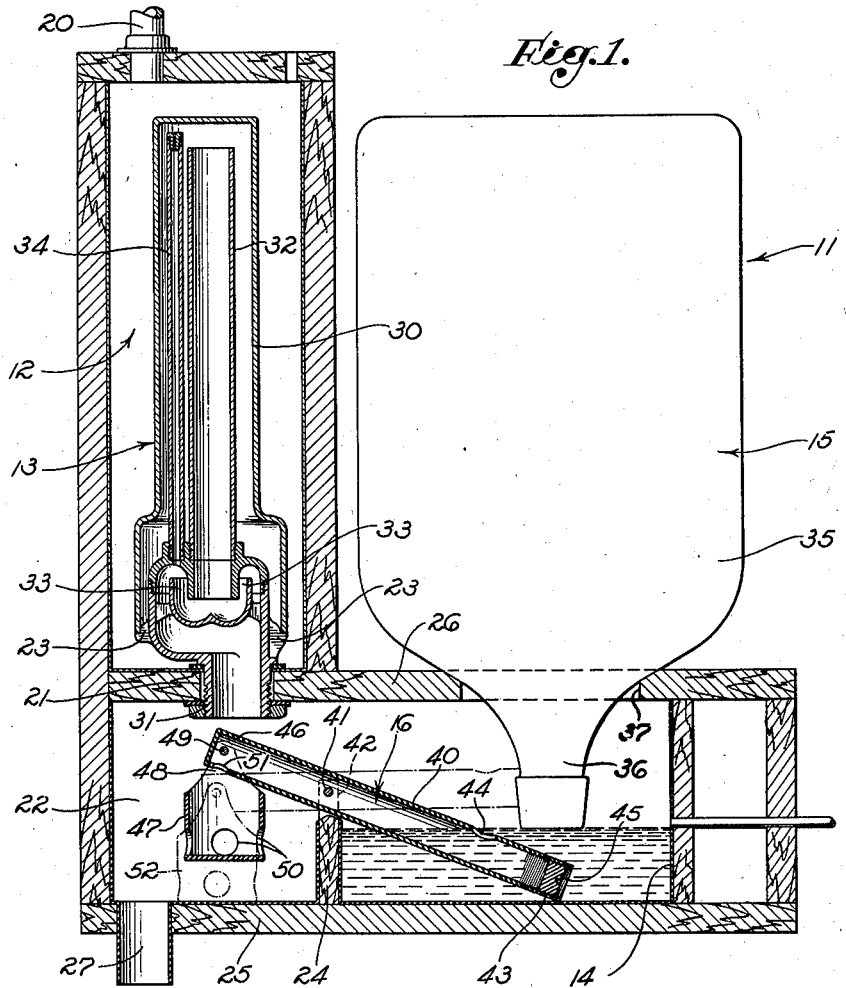
Fig. 1 is a vertical section illustrating the features embodied in my invention.

Referring to Fig. 1, my proportioning device, indicated by the numeral 11, generally comprises a supply tank 12, a means 13 for intermittently discharging a liquid from the tank in measured quantities, a solution-holding vessel 14, a means 15 for maintaining a constant level of liquid in the vessel 14, and a measuring member 16 operable to intermittently discharge from the vessel 14 a measured quantity of a solution into the liquid to be treated.

The supply tank 12 is provided with an inlet pipe 20 at the upper end thereof which supplies water, or other liquid, to the tank 12 at a constant rate of flow or in varying quantities and at varying intervals. Formed in the bottom wall of the tank 12 is a discharge opening 21, disposed above a discharge reservoir 22 into which the liquid from the tank 12 is discharged, in a manner and for a purpose to be later described.

As shown, I prefer to provide the solution-holding vessel 14 and the reservoir 22 by arranging a horizontally elongated container having a dividing wall 24 extending upwardly from the bottom wall 25 of the container and terminating short of the top wall 26 thereof, as shown in the drawing. The portion of the container 23 to the rightward of the intermediate wall 24 comprises the solution-holding vessel 14, and the portion thereof to the leftward of the intermediate wall comprises the discharge reservoir 22. Formed through the bottom wall 25 of the reservoir 22 is an outlet opening 27 through which water may be discharged from the reservoir into a pipe line or other means from which water treated by the device is used.

The means of my invention for intermittently discharging water from the tank 12 into the reservoir 22 in measured quantities, may comprise any suitable means, such as a float valve or the like, operable to discharge the liquid from the tank when the liquid reaches a predetermined level therein. In the preferred form, however, I utilize a siphon valve of the character shown which comprises a shell 30 having a nipple 31 adapted to extend through the opening 21 and arranged to be secured to the wall 26, substantially as shown. The shell 30 is provided with inlet openings 23 adjacent the bottom thereof through which liquid may enter from the tank 12 to flow upwardly within the shell 30. Disposed within the shell 30 is a vertical stand pipe 32 which communicates with the reservoir 22 through passages 33 and the nipple 31, as shown. The valve also includes a vertically disposed vent pipe 34 communicating with the passage 33 and terminating upwardly at a point above the upper end of the stand pipe 32. The details of construction of the siphon valve form no part of my present invention, it being commercially well known, but I have described the valve with sufficient particularity to make the mode of operation of my invention clear when it is later described.

One simple manner of maintaining a solution in the vessel 14 at a constant level, and one which I prefer to utilize, comprises an inverted bottle 35, the neck portion 36 of which extends downwardly through an opening 37 provided in the top wall 26 of the container above the vessel 14, as shown. This arrangement establishes a fluid level in the vessel 14 and maintains this level in a manner well known and which needs no further description.

The measuring member 16 preferably comprises a tubular member 40 pivoted to extend transversely across the top of the wall 24, as by a pin 41 supported by suitable brackets 42, in the manner shown. The tube 40 is unbalanced so that the inner end 43 thereof normally rests on the bottom of the vessel 14 so as to be submerged in the solution therein, in the manner shown. Formed in the tube 40 at the normal level of the solution in the vessel 14 is an opening 44 through which the solution may enter the tube 40 and assume a level determined by the level of the solution in the vessel 14. The end 43 of the tube 40 is closed by a threaded plug 45 which may be threaded inwardly or outwardly to vary the quantity of liquid which the tube may contain. Pivotally mounted on the outer end 46 of the tube 40 is a member 47 disposed in the path of liquid discharged through the passage 33 so that the liquid will impinge thereon transmitting a force to the tube 40 to swing the outer end 46 thereof downwardly and thus empty the contents of the tube into the discharge reservoir 22. In the preferred form of the invention, I provide a member 47 in the form of a bucket having upwardly extending relatively spaced arms 48 pinned to the outer end 46 of the tube, as shown at 49, the bucket having a series of enlarged openings 50 in the side wall thereof through which the liquid impinging on the bottom wall of the bucket may quickly drain.

The mode of operation of my invention is as follows:

Water or other liquid is supplied to the tank 12 through the pipe line 20 at a constant rate of flow or at varying intervals and in varying quantities, the water gradually assuming a predetermined level in the tank 12, and within the shell 30 of the siphon valve. As the level of the liquid rises within the shell the air above the level thereof is vented through the vent pipe 34, and as the liquid level reaches a height level with the top of the stand pipe 32 it spills into the pipe and is discharged into the passages 33 which is effective to close the vent pipe 34 and cause the column of water in the stand pipe 32 and passages 33 to siphon the liquid from the tank 12. Thus, it will be seen that at intervals determined by the volume of liquid supplied to the tank a measured quantity of liquid is discharged into the discharge reservoir 22. When liquid is discharged by the siphon valve, it is emptied directly into the bucket 47 causing the force of the liquid impinging thereon to tilt the tube 40 into the position indicated by the dotted lines 52 which permits the solution within the tube 40 to be emptied from the opening 51 into the discharge reservoir 22. Thus, it will be seen that as measured quantities of liquid are discharged from the tank 12 the measuring member is actuated thereby to discharge measured quantities of solution from the vessel 14 into each measured quantity of liquid discharged from the tank 12.

Figure 2:
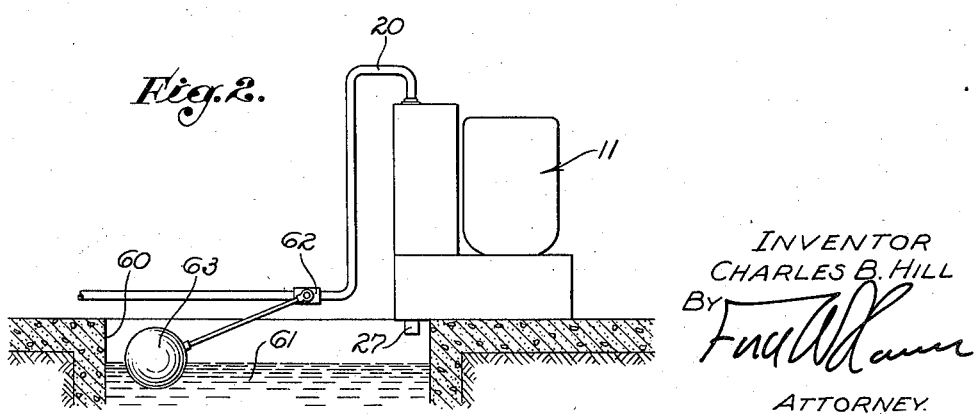
Fig. 2 is a utility view illustrating one of the uses to which my invention may be applied.

In practice, the solution intermittently discharged from the vessel 14, need not be discharged into the liquid flowing from the tank 12, but may be discharged directly into the liquid to be treated. In Fig. 2, by way of illustrating one use of my invention, I show the proportioning device 11 associated with a reservoir 60 confining a body of water 61, the reservoir being a swimming pool, an animal watering trough, or the like, from which water is used so that the level thereof in the reservoir varies according to the amount used therefrom. The proportioning device 11 is positioned so that the outlet opening 27 of the reservoir 22 discharges directly into the body of water 61 in the reservoir 60. In this embodiment, I show a float valve 62 in the supply pipe 20, the valve including a float 63 actuated by the fluctuation of the level of water in the reservoir 60 to supply varying amounts of water through the pipe 20 to the tank 12 in proportions substantially equal in volume to the amount used from the reservoir 60. It will be seen that with the proportioning device operating in the manner above described to discharge quantities of solution into the liquid discharge from the tank 12 in exact proportion thereto, the body of water or other liquid in the reservoir 60 is constantly replenished as it is used to maintain a constant volume of liquid therein having exactly proportioned amounts of the solution and the liquid.

I have shown only one simple form of my invention which I have described in detail but it should be understood that I do not intend the invention to be limited to the details of construction shown and described. I intend the true scope of the invention to be interpreted by the appended claims.

I claim as my invention:

1. In a proportioning device of the character described, the combination of: a supply tank; means for supplying liquid thereto; means for intermittently discharging liquid from said tank in measured quantities and at intervals controlled as a function of the volume of liquid supplied to said tank; a solution-holding vessel; an unbalanced measuring member normally submerged in the solution in said vessel to receive a measured quantity of said solution and having a discharge portion extending outside of said vessel; and an impact member positioned in the path of the liquid discharged from said tank and arranged to transmit the force of the liquid impinging thereon to said measuring member to overcome the unbalanced condition thereof and discharge said measured quantity of solution from said vessel.

2. In a proportioning device of the character described, the combination of: a supply tank; means for supplying liquid thereto; means for intermittently discharging liquid from said tank in measured quantities and at intervals controlled as a function of the volume of liquid supplied to said tank; a solution-holding vessel; means for maintaining a constant level of solution in said vessel; an unbalanced measuring member normally submerged in the solution in said vessel to receive a measured quantity of said solution and having a discharge portion extending outside of said vessel; and an impact member positioned in the path of the liquid discharged from said tank and arranged to transmit the force of the liquid impinging thereon to said measuring member to overcome the un- 3. In a proportioning device of the character described, the combination of: a supply tank; means for supplying liquid thereto; means for intermittently discharging liquid from said tank in measured quantities and at intervals controlled as a function of the volume of liquid supplied to said tank; a solution-holding vessel; means for maintaining a constant level of solution in said vessel; a tilting measuring member pivoted across one wall of said vessel and unbalanced to normally submerge a measuring end thereof in said solution, said member having walls forming a discharge passage therethrough communicating with said measuring end; and an impact member carried by said measuring member outside of said vessel and positioned in the path of liquid discharged from said tank whereby the force of said liquid impinging on said impact member tilts said measuring member to discharge a measured quantity of solution from said vessel.

4. In a proportioning device of the character described, the combination of: a supply tank; means for supplying liquid thereto; means for intermittently discharging liquid from said tank in measured quantities and at intervals controlled as a function of the volume of liquid supplied to said tank; a solution-holding vessel; an unbalanced measuring member normally submerged in the solution in said vessel to receive a measured quantity of said solution and having a discharge portion extending outside of said vessel; an impact member positioned in the path of the liquid discharged from said tank and arranged to transmit the force of the liquid impinging thereon to said measuring member to overcome the unbalanced condition thereof and discharge said measured quantity of solution from said vessel; and adjustable means for varying the capacity of said measuring member to change the volume of solution received thereby when submerged.

5. In a proportioning device of the character described, the combination of: a supply tank; means for supplying liquid thereto; means for intermittently discharging liquid from said tank in measured quantities and at intervals controlled as a function of the volume of liquid supplied to said tank; a solution-holding vessel; means for maintaining a constant level of solution in said vessel; a tilting measuring member pivoted across one wall of said vessel and unbalanced to normally submerge a measuring end thereof in said solution, said member having walls forming a discharge passage therethrough communicating with said measuring end; an impact member carried by said measuring member outside of said vessel and positioned in the path of liquid discharged from said tank whereby the force of said liquid impinging on said impact member tilts said measuring member to discharge a measured quantity of solution from said vessel; and adjustable means for varying the capacity of said measuring member to change the volume of solution received thereby when submerged.

6. In a proportioning device of the character described, the combination of: a liquid-conducting means from which liquid intermittently flows; a solution-holding vessel; an unbalanced measuring member normally submerged in the solution in said vessel to receive a measured quantity of said solution and having a discharge portion extending outside of said vessel; and an impact member positioned in the path of the liquid flowing intermittently from said liquid-conducting means and arranged to transmit the force of the liquid impinging thereon to said measuring member to overcome the unbalanced condition thereof and discharge said measured quantity of solution from said vessel.

CHARLES B. HILL.